(12) United States Patent
Nonoyama

(10) Patent No.: US 11,761,529 B2
(45) Date of Patent: Sep. 19, 2023

(54) TRANSMISSION DEVICE

(71) Applicant: MUSASHI SEIMITSU INDUSTRY CO., LTD., Toyohashi (JP)

(72) Inventor: Kazunori Nonoyama, Toyohashi (JP)

(73) Assignee: Musashi Seimitsu Industry Co., Ltd., Aichi (JP)

(*) Notice: Subject to any disclaimer, the term of this patent is extended or adjusted under 35 U.S.C. 154(b) by 0 days.

(21) Appl. No.: 17/640,100

(22) PCT Filed: Sep. 10, 2019

(86) PCT No.: PCT/JP2019/035566
§ 371 (c)(1),
(2) Date: Mar. 3, 2022

(87) PCT Pub. No.: WO2021/048927
PCT Pub. Date: Mar. 18, 2021

(65) Prior Publication Data
US 2022/0290753 A1    Sep. 15, 2022

(51) Int. Cl.
*F16H 57/02* (2012.01)
*F16H 57/04* (2010.01)
(Continued)

(52) U.S. Cl.
CPC ......... *F16H 57/027* (2013.01); *F16H 57/045* (2013.01); *F16H 63/3425* (2013.01);
(Continued)

(58) Field of Classification Search
CPC ............... F16H 57/027; F16H 57/045; F16H 2057/02017; F16H 2057/0216;
(Continued)

(56) References Cited

U.S. PATENT DOCUMENTS 5,531,303 A * 7/1996 Raszkowski ............ B60T 1/005
192/219.5
10,920,884 B2 * 2/2021 Tamura ................... F16H 63/34
(Continued)

FOREIGN PATENT DOCUMENTS

CN          114901975 A  *  8/2022
JP        2002-250440 A     9/2002
(Continued)

OTHER PUBLICATIONS

Machine translation of WO 2018/070056 A1 obtained on Feb. 21, 2023.*

(Continued)

*Primary Examiner* — Adam D Rogers
(74) *Attorney, Agent, or Firm* — Carrier, Shende & Associates P.C.; Fulchand P. Shende; Joseph P. Carrier

(57) ABSTRACT

A transmission device is provided in which a parking mechanism and a breather chamber are provided within a power-transmission case, the breather chamber being present at least above an input gear and providing communication between the interior of the power-transmission case and the exterior of the power-transmission case, wherein the breather chamber, which is present at least above the input gear and providing communication between the interior of the power-transmission case and the exterior of the power-transmission case, extends further outward than the input gear in an arrangement direction of the input gear and the output gear, and part of the parking mechanism is disposed within the breather chamber. Thus, it is possible to increase the capacity of a breather chamber while avoiding an increase in the size of a transmission device.

4 Claims, 8 Drawing Sheets

(51) Int. Cl.
  *F16H 63/34* (2006.01)
  *F16H 57/027* (2012.01)
  *F16H 57/021* (2012.01)
(52) U.S. Cl.
  CPC ............... *F16H 2057/0216* (2013.01); *F16H 2057/02017* (2013.01)
(58) Field of Classification Search
  CPC ............ F16H 63/3425; F16H 63/3433; F16H 2057/02016; F16H 2057/0217
  See application file for complete search history.

(56) References Cited

U.S. PATENT DOCUMENTS

2011/0011204 A1* 1/2011 Ueno ...................... F16H 63/48
                                                              74/606 R
2013/0192400 A1* 8/2013 Dodo .................. F16H 57/0476
                                                              74/421 A
2022/0049768 A1* 2/2022 Nakamatsu ........... F16H 57/045

FOREIGN PATENT DOCUMENTS

| JP | 2011-021663 A | 2/2011 | | |
| JP | 2015-034567 A | 2/2015 | | |
| JP | 2018-031447 A | 3/2018 | | |
| WO | WO-2018070056 A1 | * | 4/2018 | ......... B60B 27/0021 |
| WO | WO-2019131424 A1 | * | 7/2019 | ............. H02K 11/33 |

OTHER PUBLICATIONS

Office Action, Notification of Reasons for Refusal, dated Mar. 8, 2023, issued in the corresponding Japanese Patent Application No. 2021-545010 with the English translation thereof.

* cited by examiner

TRANSMISSION DEVICE

TECHNICAL FIELD

The present invention relates to a transmission device, and in particular to a transmission device that includes within a power-transmission case a gear train having an input gear that is supported on an input shaft, an intermediate gear that is supported on an intermediate shaft parallel to the input shaft and that meshes with the input gear, and an output gear that can rotate around an output shaft parallel to the input shaft and that meshes with the intermediate gear, and a parking mechanism that can restrict rotation of the input shaft.

BACKGROUND ART

The transmission device is already known, as disclosed in for example Patent Document 1 below.

PRIOR ART DOCUMENTS

Patent Documents

Patent Document 1: Japanese Patent Application Laid-open No. 2018-31447

SUMMARY OF THE INVENTION

Problems to be Solved by the Invention

In the conventional device, a breather chamber is disposed above an input gear and an intermediate gear within a power-transmission case. The breather chamber and a detent shaft of a parking mechanism placed outside the breather chamber are disposed so as to be arranged in the arrangement direction of the input gear and the intermediate gear.

Because of this, if the breather chamber is extended outward beyond the input gear in the arrangement direction so as to ensure a larger capacity in order to prevent lubricating oil from spilling over or enhance the ability of collecting oil mist, since the detent shaft of the parking mechanism is present further outside than the input gear, it is impossible to extend the breather chamber sufficiently in the direction.

Furthermore, although it is possible to extend the breather chamber upward where there is no possibility of interference with the parking mechanism, in this case there is the problem that the transmission device increases in size in the height direction.

The present invention has been proposed in light of the above circumstances, and it is an object thereof to provide a transmission device that can solve the above problems with a simple structure.

Means for Solving the Problems

In order to attain the above object, according to a first aspect of the present invention, there is provided a transmission device comprising, within a power-transmission case, a gear train having an input gear that is supported on an input shaft, an intermediate gear that is supported on an intermediate shaft parallel to the input shaft and that meshes with the input gear, and an output gear that can rotate around an output shaft parallel to the input shaft and that meshes with the intermediate gear, and a parking mechanism that can restrict rotation of the input shaft, characterized in that a breather chamber is provided within the power-transmission case, the breather chamber being present at least above the input gear and providing communication between an interior of the power-transmission case and an exterior of the power-transmission case, the breather chamber extends further outward than the input gear in an arrangement direction of the input gear and the output gear, and part of the parking mechanism is disposed within the breather chamber.

Further, according to a second aspect of the present invention, in addition to the first aspect, the parking mechanism comprises a parking gear that is fixedly provided on the input shaft, a detent shaft that can rotate around a vertical rotational axis, and a parking pawl that can engage with and disengage from the parking gear in association with rotation of the detent shaft, and the detent shaft extends in an up-and-down direction and extends through the breather chamber in the up-and-down direction.

Furthermore, according to a third aspect of the present invention, in addition to the second aspect, a bottom wall part, extending further outward than the input gear in the arrangement direction, of the breather chamber has a through hole in the up-and-down direction that also functions as an inlet of the breather chamber, and the detent shaft extends through the through hole via a cavity.

Moreover, according to a fourth aspect of the present invention, in addition to the third aspect, at least part of a portion, that is further downward than the through hole, of the detent shaft is rotatably supported on a bulging wall portion that is projectingly provided on an inner wall of the power-transmission case so as to face inward, and an upper part of the bulging wall portion opposes a lower end opening of the through hole across a gap.

Further, according to a fifth aspect of the present invention, in addition to the third or fourth aspect, a lower end of the bottom wall part of the breather chamber is disposed at a position lower than an upper end of the input gear.

Effects of the Invention

In accordance with the first aspect, there is provided the transmission device, in which the parking mechanism and the breather chamber are provided within the power-transmission case, the breather chamber being present at least above the input gear and providing communication between the interior of the power-transmission case and the exterior of the power-transmission case, the breather chamber extending further outward than the input gear in the arrangement direction of the input gear and the output gear, and part of the parking mechanism being disposed within the breather chamber. Because of this, even if the breather chamber is extended in the arrangement direction, since the part of the parking mechanism is contained in the breather chamber thus extended, it is possible to increase the capacity of the breather chamber while avoiding an increase in the size of the transmission device.

Furthermore, in accordance with the second aspect, since the parking mechanism includes the parking gear, which is fixedly provided on the input shaft, the detent shaft, which can rotate around the vertical rotational axis, and the parking pawl, which can engage with and disengage from the parking gear in association with rotation of the detent shaft, and the detent shaft extends in the up-and-down direction and extends through the breather chamber in the up-and-down direction, it is unnecessary to dispose the detent shaft outward so as to avoid the breather chamber even if it is formed lengthwise in the up-and-down direction. It thereby becomes possible to avoid any increase in the size of the transmission device even with use of the detent shaft, which is long in the up-and-down direction.

Moreover, in accordance with the third aspect, since the bottom wall part, extending further outward than the input gear in the arrangement direction, of the breather chamber has the through hole in the up-and-down direction that also functions as an inlet of the breather chamber, and the detent shaft extends through the through hole via the cavity, it is possible to prevent effectively oil from entering the interior of the breather chamber via its inlet while ensuring smooth air flow at the inlet of the breather chamber. Moreover, such a detent shaft is also used as means for narrowing the inlet of the breather chamber, thereby simplifying the structure of the transmission device and consequently reducing the cost.

Furthermore, in accordance with the fourth aspect, since at least part of a portion, that is further downward than the through hole, of the detent shaft is supported on the bulging wall portion, which is projectingly provided on the inner wall of the power-transmission case so as to face inward, and the upper part of the bulging wall portion opposes the lower end opening of the through hole, due to the shielding effect of the bulging wall portion it becomes possible to suppress the entry of scattered lubricating oil from the gear train into the through hole (that is, the inlet of the breather chamber) and, as a result, in synergy with the effect of narrowing the through hole by means of the detent shaft, it becomes possible to prevent more effectively scattered lubricating oil from entering the interior of the breather chamber. Furthermore, since the bulging wall portion is used as shaft support means for rotatably and stably supporting the detent shaft as well as shielding means for shielding a passage for lubricating oil to the through hole, it becomes unnecessary to provide shielding means exclusively used therefor, thus simplifying the structure and consequently contributing to a reduction in the cost.

Moreover, in accordance with the fifth aspect, since the lower end of the bottom wall part of the breather chamber is disposed at a position lower than the upper end of the input gear, the lower end opening of the through hole, which becomes the inlet of the breather chamber, can be set at a relatively low position, and this enables the entry of scattered lubricating oil from the input gear in close proximity to the through hole into the through hole to be suppressed effectively, thereby enabling scattered lubricating oil to be prevented from entering the interior of the breather chamber more effectively. Moreover, the bottom wall part of the breather chamber can be disposed at a relatively low position, thus making it advantageous in terms of increasing the capacity of the breather chamber.

EXPLANATION OF REFERENCE NUMERALS AND SYMBOLS

Figure 1:
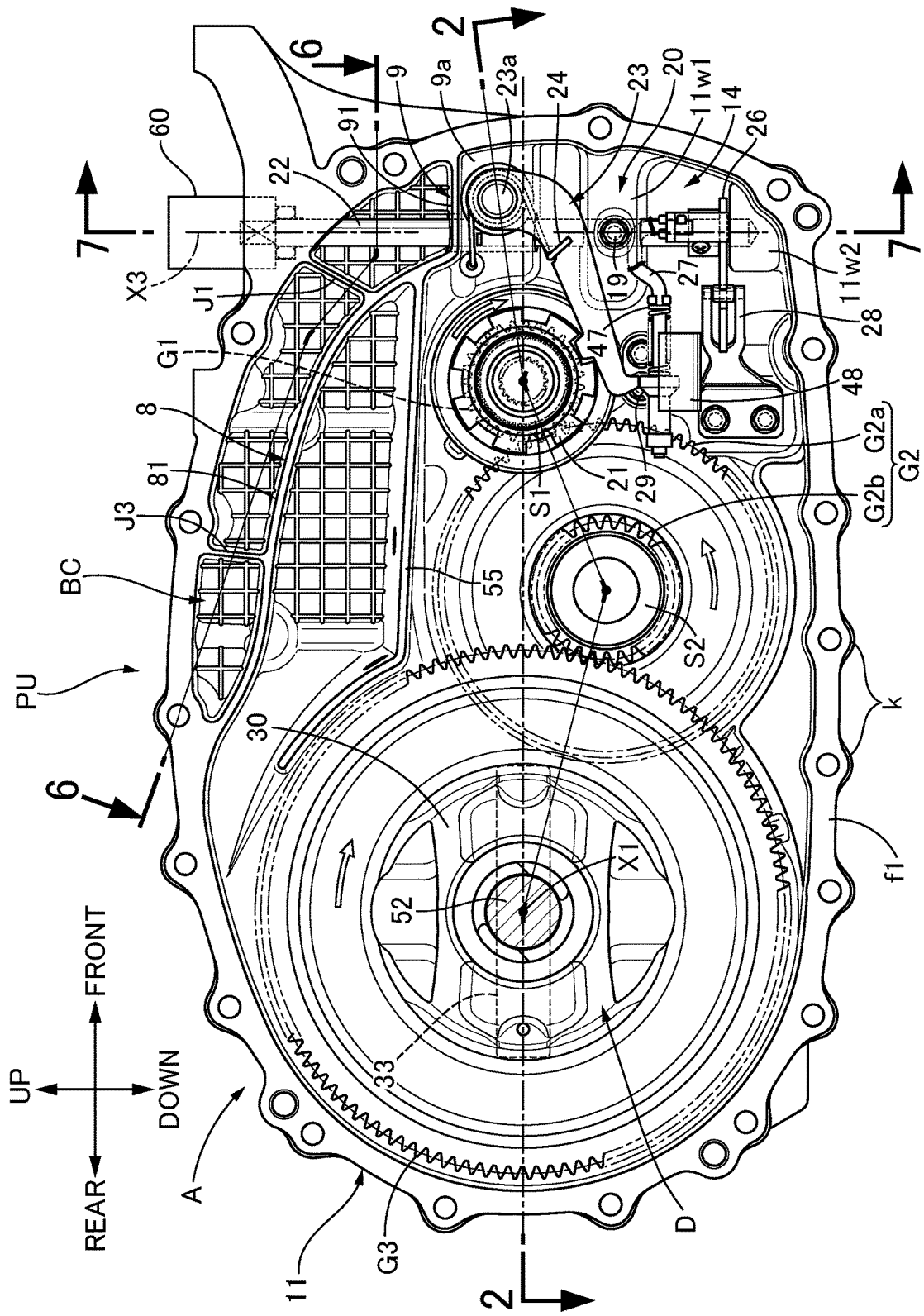
FIG. 1 is a sectional view (sectional view along line 1-1 in FIG. 2) when the internal structure of a transmission device related to one embodiment of the present invention is viewed from the right-hand side in a state in which a right case half body of a power-transmission case is removed. (first embodiment)

A Transmission device
BC Breather chamber
G1, G2, G3 Input gear, intermediate gear, output gear
S1, S2, S3 Input shaft, intermediate shaft, output shaft
X3 Rotational axis
9 Bottom wall part
9h Through hole (inlet of breather chamber)
9hi Lower end opening of through hole
10 Power-transmission case
11w1 First bulging wall portion (bulging wall portion)
20 Parking mechanism
21 Parking gear
22 Detent shaft
23 Parking pawl
51, 52 First and second output shafts (output shaft)
70 Cavity

MODES FOR CARRYING OUT THE INVENTION

An embodiment of the present invention is explained below by reference to the attached drawings.

First Embodiment

Figure 2:
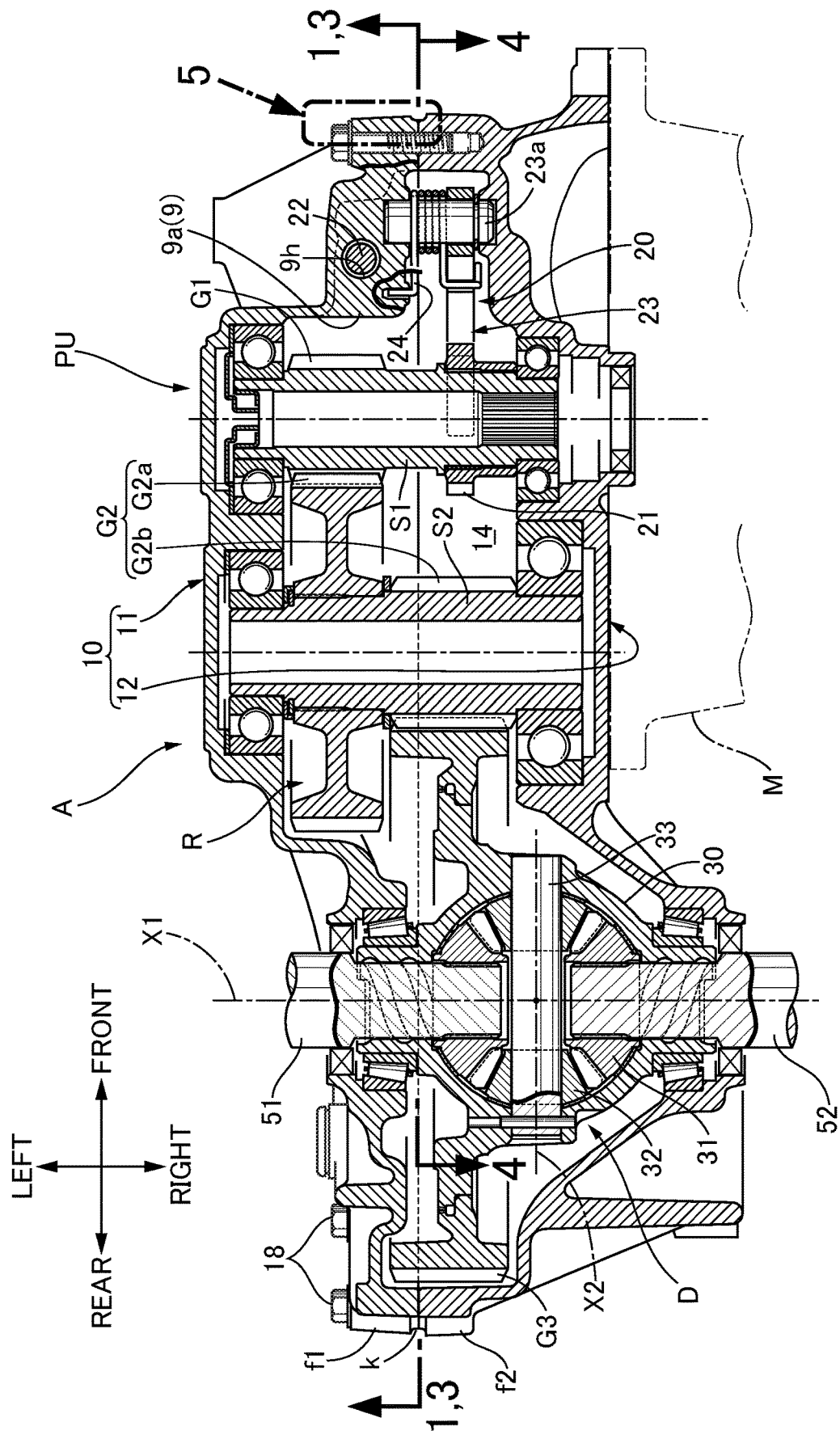
FIG. 2 is a sectional view along line 2-2 in FIG. 1. (first embodiment)

First, in FIG. 1 and FIG. 2, a power unit PU mounted on a vehicle, for example an automobile, includes a power-transmission case 10 that is supported at an appropriate position of a vehicle body, an electric motor M as a power source that is fitted to one side part of the power-transmission case 10, a reduction device R that is disposed within the power-transmission case 10 and reduces the speed of output of the electric motor M, and a differential device D that is similarly disposed within the power-transmission case 10 and distributes the output of the reduction gear R between left and right driven wheels while allowing differential rotation.

In the present specification, the front-and-rear and left-and-right directions are front-and-rear and left-and-right directions in a state in which the power unit PU is mounted on the vehicle.

The power-transmission case 10 is dividedly formed from left and right case half bodies 11, 12 that are detachably joined to each other by means of a plurality of bolts 18. Mounting flange parts f1, f2 are connectedly provided integrally with the outer peripheries of mutually opposing faces of the left and right case half bodies 11, 12, each bolt 18 extending through one f1 of the mounting flange parts and being screwed and secured to the other f2 of the mounting flange parts.

Figure 5:
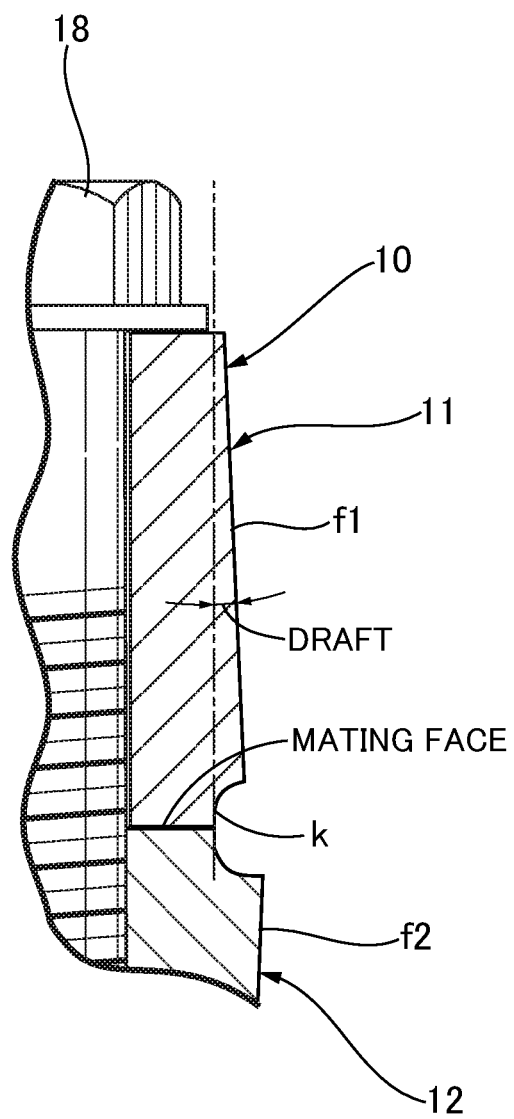
FIG. 5 is an enlarged sectional view of a part shown by arrow 5 in FIG. 2. (first embodiment)
Figure 6:
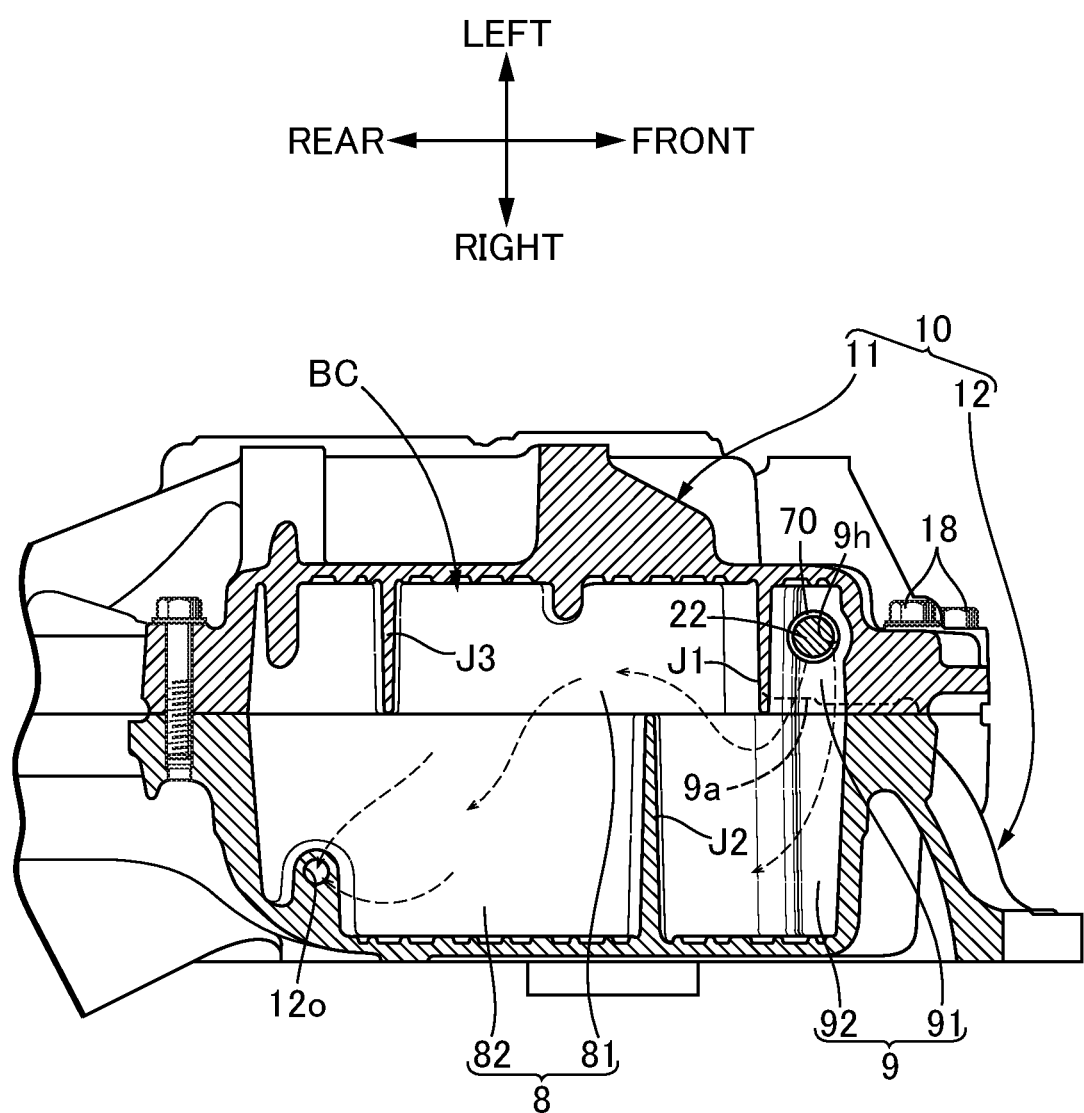
FIG. 6 is a sectional view along line 6-6 in FIG. 1. (first embodiment)

The left and right case half bodies 11, 12 are molded by casting. In relation thereto, for example, a draft is imparted to an outer peripheral face of the mounting flange part f1 of the left case half body 11, the draft gradually increasing outward in going from a bolt seating face toward the mutually mating faces of the two mounting flange parts f1, f2 as illustrated in FIG. 5, thereby enabling smooth mold release after casting.

A cutout part k is formed in the outer peripheral side of bolt fastening parts of the two mounting flange parts f1, f2 so as to straddle the mating faces, the cutout part k functioning to suppress any additional increase in the area of the mating face caused by the draft. That is, due to the cutout part k being specially provided, even if the draft is present, the area of the mating faces via which the two mounting flange parts f1, f2 are in contact with each other is reduced, the contact surface pressure due to fastening by the bolt 18 is increased (and consequently the sealing properties are improved), and in addition the weight of the case is lightened.

Figure 3:
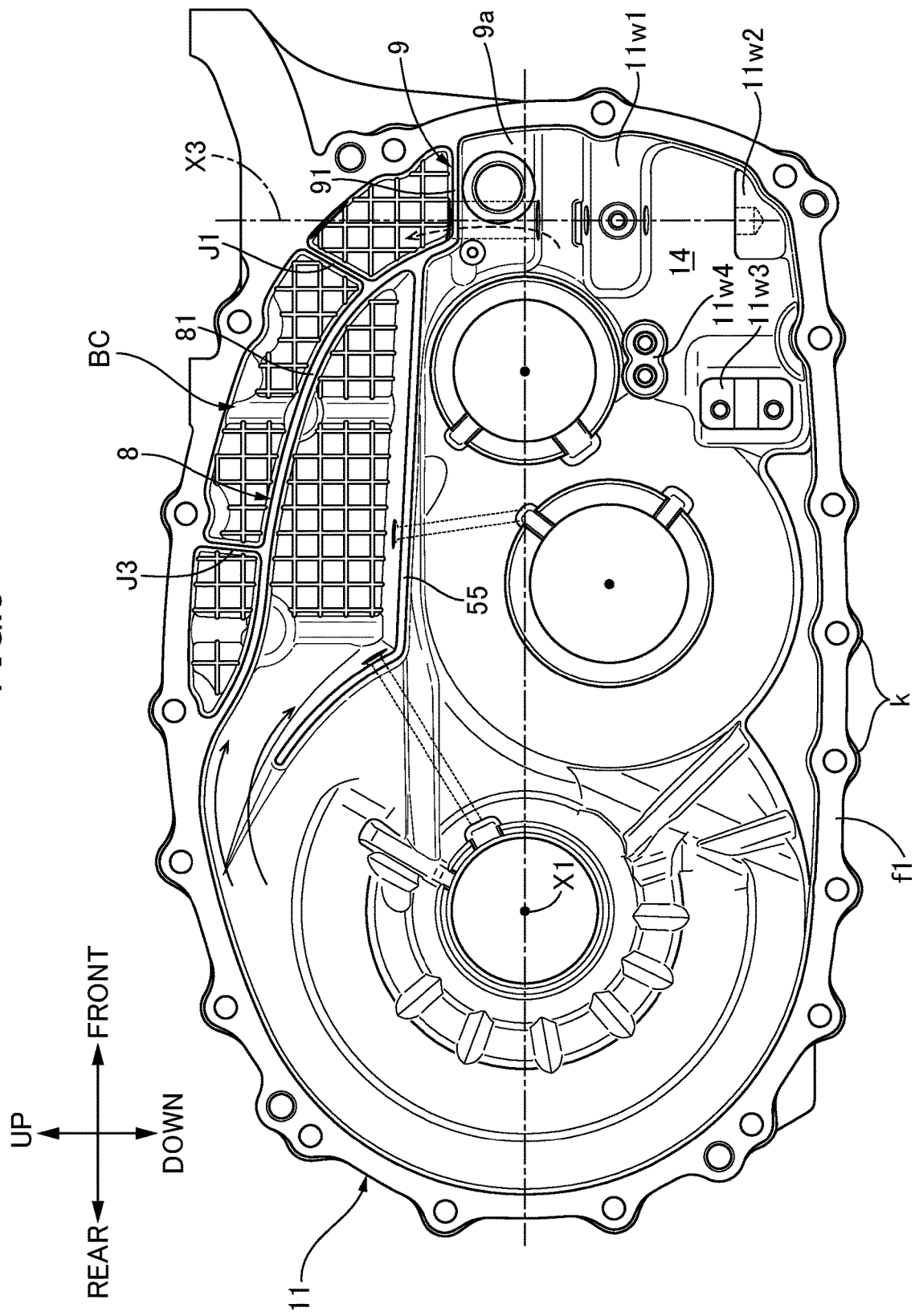
FIG. 3 is a sectional view corresponding to FIG. 1 (sectional view along line 3-3 in FIG. 2) showing only a left case half body of the power-transmission case. (first embodiment)
Figure 4:
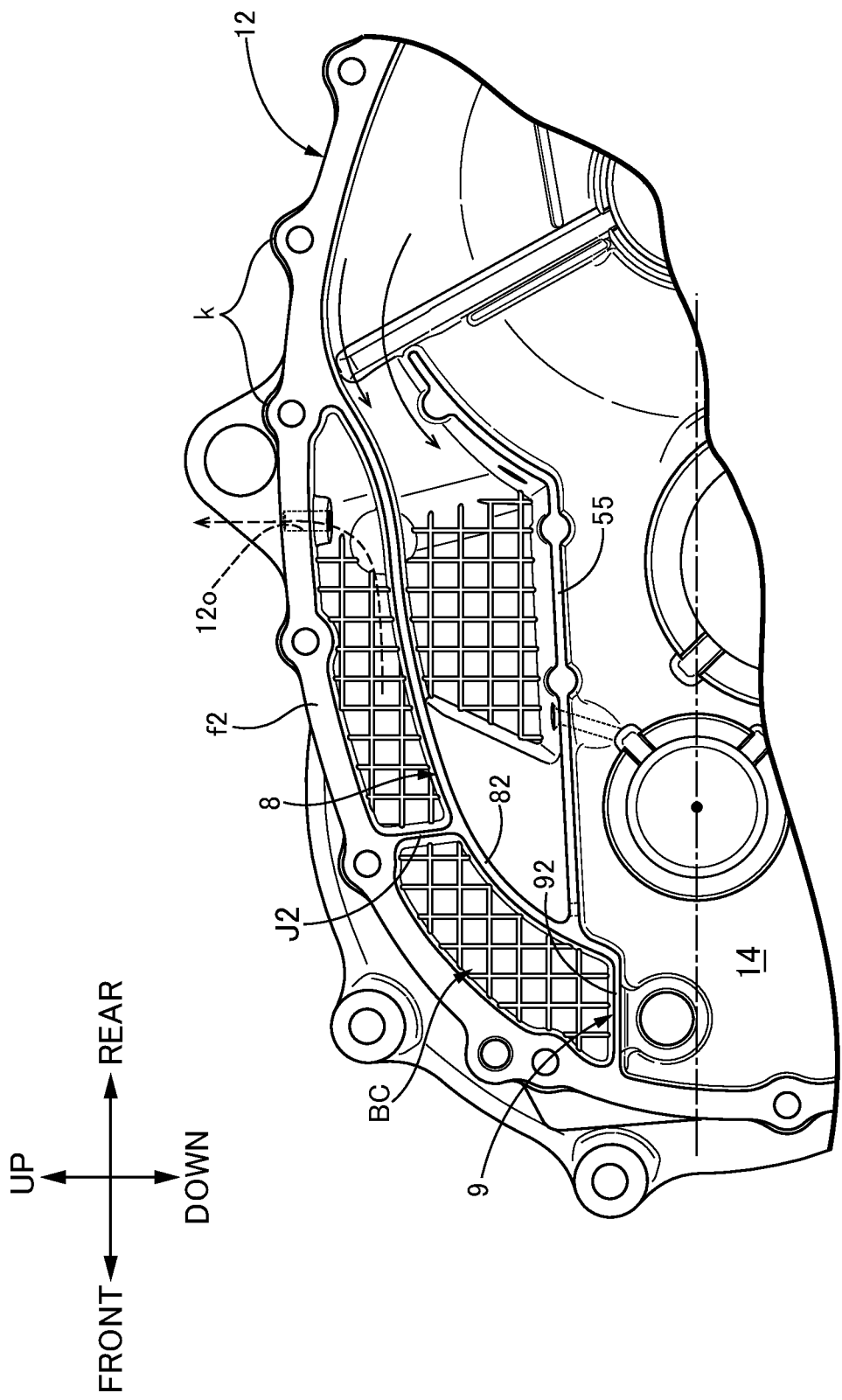
FIG. 4 is a left side view (sectional view along line 4-4 in FIG. 2) when the right case half body is viewed from the left-hand side on its own. (first embodiment)

One example of the reduction device R is now explained by reference mainly to FIG. 1 to FIG. 3.

The reduction device R has, as a main part, a gear train having for example an input gear G1 that is fixedly provided on an input shaft S1, an intermediate gear G2 that is fixedly supported on an intermediate shaft S2 located beneath and to the rear of the input shaft S1 and parallel to the input shaft S1 and that meshes with the input gear G1, and an output gear G3 that can rotate around a predetermined axis X1 parallel to the input shaft S1 (that is, first and second output shafts 51, 52, which are described later) and that meshes with the intermediate gear G2. As is clear from FIG. 1, the axis of the input shaft S1 and the predetermined axis X1 are positioned at substantially the same height and are disposed at positions higher than the axis of the intermediate shaft S2.

Opposite end parts of each of the input shaft S1 and the intermediate shaft S2 are supported on the left and right case half bodies 11, 12 so that they can rotate around respective horizontal axes via a bearing. In the present embodiment, the intermediate gear G2 is formed as a two-stage gear from a large-diameter first intermediate gear portion G2a meshing with the input gear G1 and a small-diameter second intermediate gear portion G2b integrally and coaxially rotating with the first intermediate gear portion G2a and meshing with the output gear G3, and transmits rotation of the input gear G1 toward the output gear G3 side while reducing the speed in two stages. It should be noted here that the intermediate gear G2 may be formed as a single gear.

The input shaft S1 is operatively linked to an output shaft, which is not illustrated, of the electric motor M and receives a rotational force from the electric motor M. The output gear G3 is fixed (for example, welded) to an outer peripheral part of a differential case 30 of the differential device D.

In the present embodiment, the gear teeth of the input gear G1, the intermediate gear G2 and the output gear G3 are formed as helical teeth, but in FIG. 2 the gear teeth are illustrated as a cross section along the line of the tooth for convenience. The gear teeth of the input gear G1, the intermediate gear G2 and the output gear G3 may be formed from a spur gear tooth instead of the helical gear tooth.

Lubricating oil is stored in a bottom part within the power-transmission case 10, and the oil level is set to a degree such that lower parts of the intermediate gear G2 and the output gear G3 are partially immersed. During transmission of the gear train, the input gear G1, the intermediate gear G2 and the output gear G3 rotate in for example directions shown by hollow arrows in FIG. 1; accompanying the rotation, part of the scattered lubricating oil splashed up by the intermediate gear G2 heads toward a parking mechanism 20 side, and part of the scattered lubricating oil splashed up by the output gear G3 heads toward an inlet of an oil-collecting tank 55.

As is clearly shown in FIG. 2, the differential device D includes the differential case 30, a pair of side gears 31 that are housed within the differential case 30 and can rotate around the predetermined axis X1, a plurality of pinion gears 32 that mesh with the two side gears 31, and a pinion shaft 33 that supports the pinion gears 32 so that they can rotate around an axis X2 orthogonal to the predetermined axis X1 and that is fixed to the differential case 30. Left and right end parts of the differential case 30 are supported on the left and right case half bodies 11, 12 respectively via a bearing so that they can rotate around the predetermined axis X1.

The first and second output shafts 51, 52 coaxially disposed on the predetermined axis X1 are operatively linked to the pair of side gears 31. The two output shafts 51, 52 are coupled to and rotate left and right driven wheels via a coupling mechanism, which is not illustrated. The first and second output shafts 51, 52 are one example of the output shaft of the present invention.

The structure and the function of the differential device D are conventionally known, the rotational driving force inputted from the output gear G3 into the differential case 30 being distributed and transmitted to the first and second output shafts 51, 52 while allowing differential rotation.

Furthermore, provided within the power-transmission case 10 are the parking mechanism 20, which can restrict rotation of the input shaft S1 as required, a breather chamber BC that is present at least above the input gear G1 (in the present embodiment above each of the input gear G1 and the intermediate gear G2 and above part of the output gear G3) and provides communication between the interior and the exterior of the power-transmission case 10, and the oil-collecting tank 55, which is disposed immediately beneath the breather chamber BC and above the gear train, collects lubricating oil scattered from the gear train (mainly the output gear G3), and returns it to the gear train side. A plurality of oil holes functioning as oil passages for returning oil toward the gear train side open on a bottom face of the oil-collecting tank 55.

The breather chamber BC is now explained by reference to FIGS. 1, 3, 4 and 6. The breather chamber BC is defined by part of an upper wall of the power-transmission case 10 (in the illustrated example, a front side upper wall part), a partition wall part 8 that extends substantially along a downward-facing inner face of the part of the power-transmission case 10, a substantially horizontal bottom wall part 9 that provides an integral connection between the lower end of the partition wall part 8 and a front wall of the power-transmission case 10, and mutually opposing inside faces of the left and right case half bodies 11, 12. The breather chamber BC is formed so as to extend lengthwise in the front-and-rear direction along an inner face of an upper wall of the power-transmission case 10 and curve slightly downward in going forward.

The partition wall part 8 is formed by abutting opposing ends of partition wall-forming parts 81, 82 against each other, the partition wall-forming parts 81, 82 each protruding integrally from the mutually opposing inside faces of the left and right case half bodies 11, 12. Similarly, the bottom wall part 9 is formed by abutting opposing ends of bottom wall-forming parts 91, 92 against each other, the bottom wall-forming parts 91, 92 each protruding integrally from the mutually opposing inside faces of the left and right case half bodies 11, 12.

With regard to the breather chamber BC, the bottom wall part 9 thereof (and consequently the internal space of the breather chamber BC) extends further outward (forward in the illustrated example) than the input gear G1 in the direction in which the input gear G1 and the output gear G3 are arranged.

The bottom wall part 9, in particular the bottom wall part 9 on the left case half body 11 side, has a thick portion 9a that is thick in the up-and-down direction, and a through hole 9h in the up-and-down direction provided in the thick portion 9a becomes an inlet of the breather chamber BC. The lower end of the thick portion 9a of the bottom wall part 9 is disposed at a position lower than the upper end of the input gear G1.

On the other hand, an outlet 12o of the breather chamber BC is formed in an upper wall of the power-transmission case 10 (in the illustrated example, an intermediate part in the front-and-rear direction of an upper wall of the right case half body 12). The outlet 12o may be opened directly to the atmosphere or may be made to communicate with the atmosphere via a filter, which is not illustrated, or alternatively may be made to communicate with the atmosphere via a long pipe.

A plurality of baffle plate parts J1 to J3 forming a labyrinth within the breather chamber BC are alternately and projectingly provided on the mutually opposing inside faces of the left and right case half bodies 11, 12. Due to these baffle plate parts J1 to J3 forming a labyrinth within the breather chamber BC, the direction in which oil mist-containing air flows through the breather chamber BC from the inlet 9h toward the outlet 12o side is greatly changed, thus enhancing the mist collection effect in the breather chamber BC.

One example of the parking mechanism 20 is now explained by reference in addition to FIG. 7 and FIG. 8. The parking mechanism 20 is disposed so as to extend from the interior of the breather chamber BC to a space 14 that is positioned beneath the breather chamber BC and the oil-collecting tank 55 and forms a mechanism chamber within the power-transmission case 10.

The parking mechanism 20 of the present embodiment includes a parking gear 21 that is fixedly provided on the input shaft S1 to the side of the input gear G1, a detent shaft 22 that can rotate around a vertical rotational axis X3, a parking pawl 23 that can engage with and disengage from the parking gear 21 in association with rotation of the detent shaft 22, a return spring 24 that always urges the parking pawl 23 in a direction moving away from the parking gear 21 (that is, a direction in which the engagement is released), and a coupling mechanism 25 that makes the parking pawl 23 be engaged with and disengaged from the parking gear 21 in association with rotation of the detent shaft 22.

A base part of the parking pawl 23 is swingably supported on the power-transmission case 10 via a pivot shaft 23a having opposite end parts inserted into and supported by an inner wall of the left case half body 11 (more specifically, the thick portion 9a) and an inner wall of the right case half body 12. The parking pawl 23 has on one side of its extremity a projecting claw portion 23t that can latch with the parking gear 21 and has on the other side of its extremity a to-be-engaged portion 23f that can engage with a cam member 29, which is described later, of the coupling mechanism 25.

The parking pawl 23 can swing around the axis of the pivot shaft 23a between a lock position (solid line position in FIG. 1) in which the projecting claw portion 23t engages with the parking gear 21 so as to restrict rotation of the input shaft S1 and a lock release position in which it is present on the side away from the lock position so as to be separated from the parking gear 21 and to release the engagement.

The coupling mechanism 25 includes a detent lever 26 that is mounted on a lower part of the detent shaft 22 and pivots integrally with the detent shaft 22, a parking rod 27 that has its base part pivotably linked to a first end part of the detent lever 26, a detent spring 28 that selectively engages with and disengages from a plurality of positioning recess portions 26a, 26b provided in a second end part of the detent lever 26 to thus selectively hold the pivoting position of the detent lever 26, the cam member 29, which is fitted onto and retained by an extremity of the parking rod 27 so that it can slide within a predetermined range in the axial direction, and a buffer spring 47 that biases the cam member 29 to a sliding limit on one side (that is, the extremity side of the parking rod 27) within the predetermined range.

A gutter-shaped retaining member 48 that slidably clasps the cam member 29 is secured by a bolt to the inner wall of the left case half body 11, the retaining member 48 exhibiting a function of restricting the cam member 29 so that it does not deviate from a position corresponding to the parking pawl 23. A base part of the detent spring 28 is secured by a bolt to the inner wall of the left case half body 11.

Figure 8:
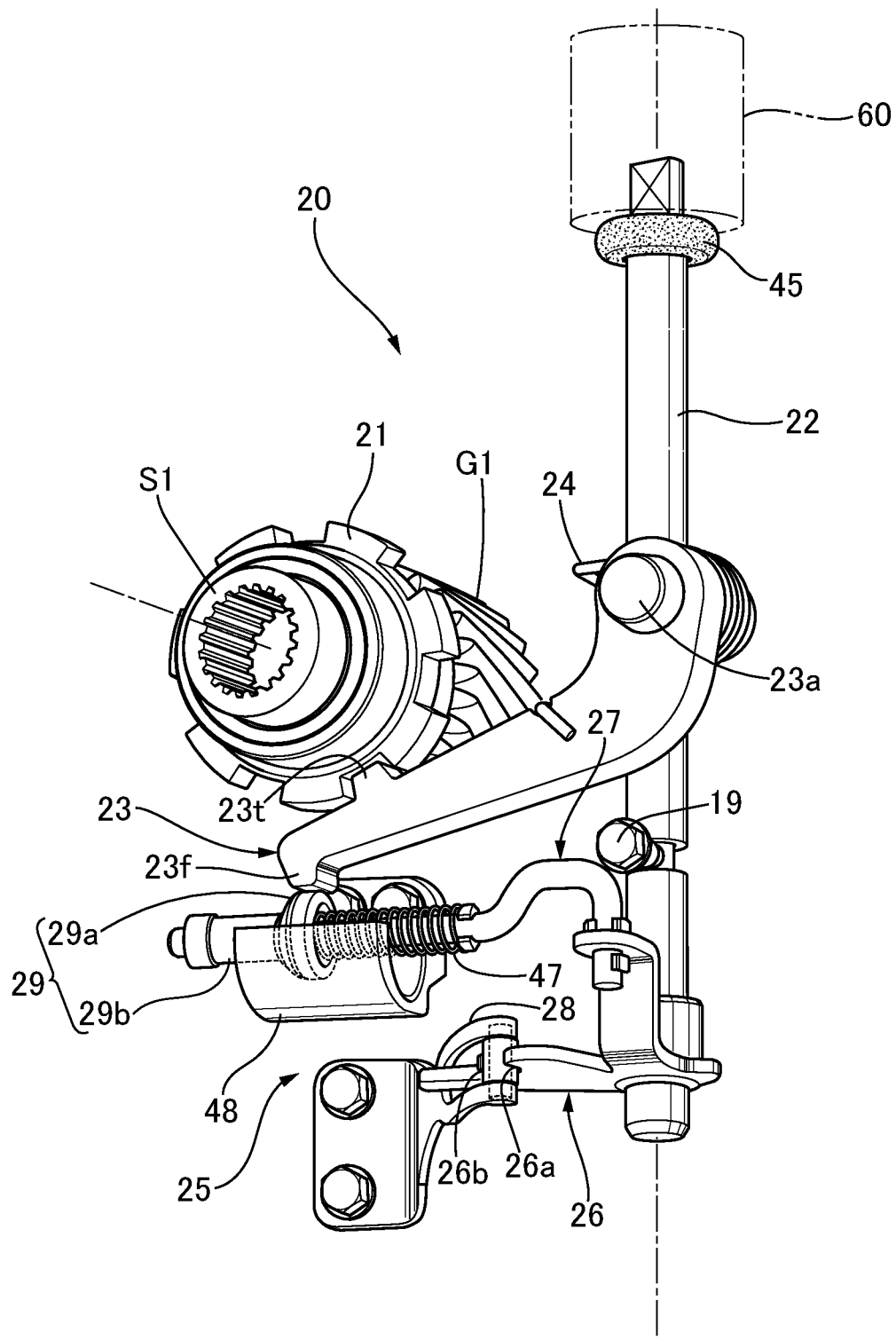
FIG. 8 is an exploded perspective view of a parking mechanism. (first embodiment)

When the detent lever 26 (and consequently the detent shaft 22) is at a first rotational position shown in FIG. 1 and FIG. 8, with regard to the cam member 29, due to a large diameter portion 29a thereof engaging with the to-be-engaged portion 23f of the parking pawl 23, the parking pawl 23 can be pushed up to the lock position side and held. The buffer spring 47 is effective in absorbing and alleviating the impact when the to-be-engaged portion 23f of the parking pawl 23 is abutted against the large diameter portion 29a of the cam member 29 and pushed upward.

FIG. 1 and FIG. 8 show a parking operation state of the parking mechanism 20; in this state the detent lever 26 (and consequently the detent shaft 22) is present at the first rotational position, and the cam member 29 pushes up the parking pawl 23 to the lock position against the resilient force of the return spring 24 and holds it. This state is maintained by the detent spring 28 engaging with the first positioning recess portion 26a of the detent lever 26.

When the detent lever 26 (and consequently the detent shaft 22) in the parking operation state is rotated to a second rotational position, in response thereto the parking rod 27 is pulled rightward in FIG. 1 and FIG. 8, accompanying it the large diameter portion 29a of the cam member 29 moves away from the to-be-engaged portion 23f of the parking pawl 23 to thus allow the to-be-engaged portion 23f to be in sliding contact with a small diameter portion 29b of the cam member 29, and the force of the cam member 29 that pushes up the parking pawl 23 is released. The parking pawl 23 is thereby swung up to the lock release position by the resilient force of the return spring 24, thus releasing the parking operation state. This release state is maintained by the detent spring 28 engaging with the second positioning recess portion 26b of the detent lever 26.

The detent shaft 22 extends in the up-and-down direction, the upper half part thereof extending through the breather chamber BC in the up-and-down direction, and the lower half part thereof passing through the space 14, in particular a space part immediately below the bottom wall part 9. Moreover, an intermediate part of the detent shaft 22 extends loosely through the through hole 9h of the bottom wall part 9 of the breather chamber BC (that is, via an annular cavity 70).

Figure 7:
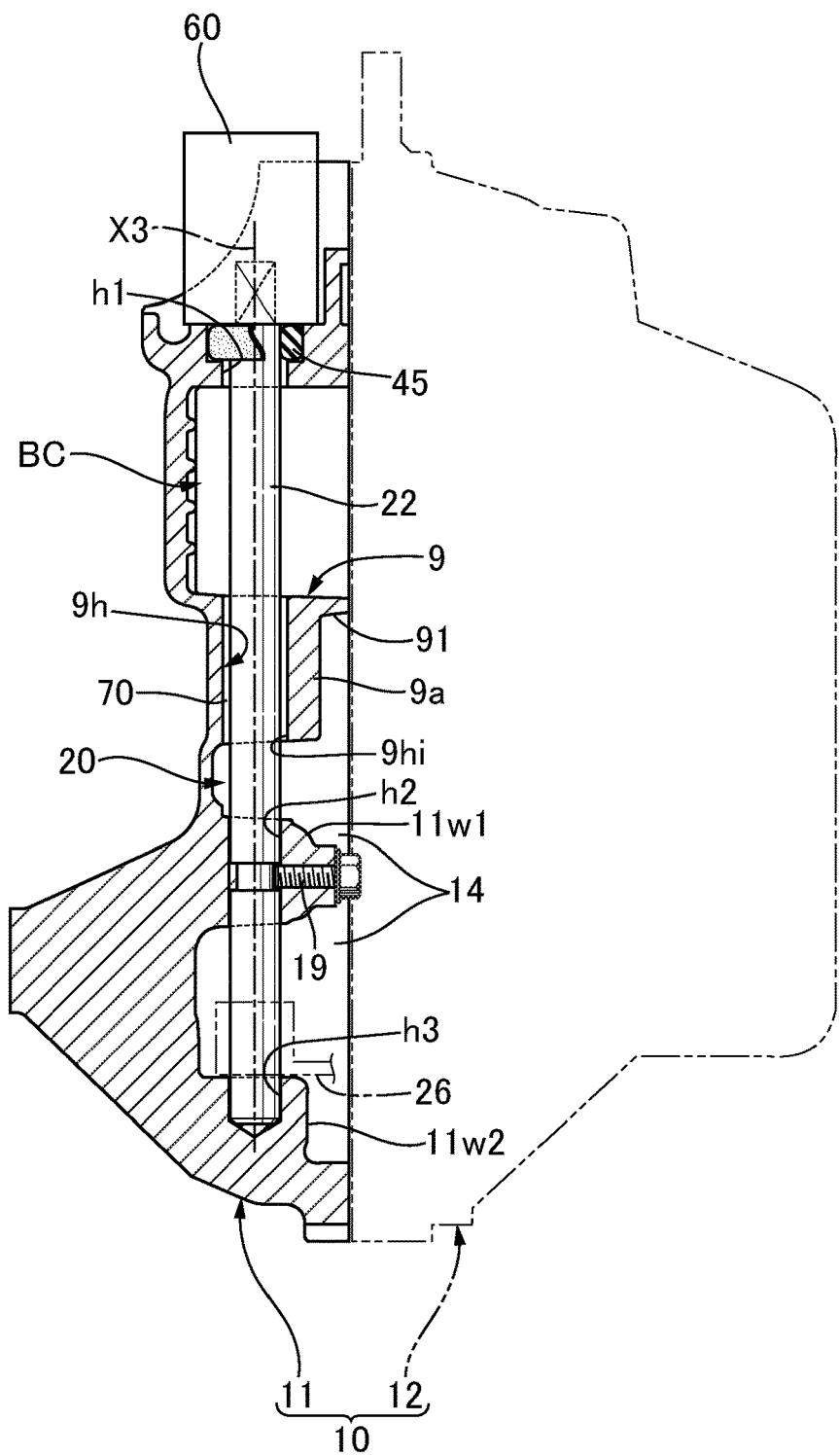
FIG. 7 is a sectional view along line 7-7 in FIG. 1. (first embodiment)

As is clear from FIG. 7, an upper end part of the detent shaft 22 is inserted through a support hole h1 provided in the left case half body 11 of the power-transmission case 10 above the breather chamber BC, and the inserted part is sealed by means of an annular oil seal 45. On the other hand, a portion, lower than the through hole 9h, of the detent shaft 22, in particular an intermediate part of the portion, is rotatably supported by a support hole h2 of a first bulging wall portion 11w1 projectingly provided on the inner wall of the left case half body 11 so as to face inward (that is, so as to protrude toward the space 14 side), and a lower end part thereof is rotatably fitted into and supported by a bottomed support hole h3 of a second bulging wall portion 11w2 that is separated downward from the first bulging wall portion 11w1.

A bolt 19 for retaining the detent shaft 22 is screwed into the first bulging wall portion 11w1. The inner end of the bolt 19 engages with an annular groove provided in the outer periphery of the intermediate part of the detent shaft 22, thus restricting axial movement of the detent shaft 22 while allowing rotation thereof.

Projectingly provided on the inner wall of the left case half body 11 so as to face inward (that is, so as to protrude toward the space 14 side) are a third bulging wall portion 11w3 that becomes a pedestal for securing a fixed end of the detent spring 28 by a bolt and a fourth bulging wall portion 11w4 that becomes a pedestal for securing a base part of the gutter-shaped retaining member 48 by a bolt. In cooperation with the detent spring 28 and the retaining member 48 mounted on the third and fourth bulging wall portions 11w3, 11w4 (and, furthermore, with other members 26, 27, 29, etc. of the coupling mechanism 25), the third and fourth bulging wall portions 11w3, 11w4 can exhibit a role of reducing the amount of oil reaching the through hole 9h by trapping part of the scattered lubricating oil splashed up by the intermediate gear G2 and heading toward the through hole 9h and returning it to a bottom part of the power-transmission case 10.

Moreover, an actuator 60 for rotating the detent shaft 22 is mounted on an upper part of the left case half body 11. The actuator 60 can selectively rotate the detent shaft 22 (and consequently the detent lever 26) between the first rotational position and the second rotational position. The actuator 60 is connected to a vehicle-mounted electronically controlled device (not illustrated), and control of energization of the actuator 60 is carried out in response to an operational input to a parking operating part of a driver's seat by an occupant.

The operation of the embodiment is now explained. In the power unit PU, which includes the transmission device A related to the present invention, when a rotational force is inputted from the electric motor M into the input shaft S1, it is reduced in speed in two stages by means of the reduction device R and transmitted to the output gear G3. The rotational force of the output gear G3 is distributed by means of the differential device D between the first and second output shafts 51, 52 while allowing differential rotation, and is transmitted from the first and second output shafts 51, 52 to the left and right driven wheels.

In response to an operational input into the parking operating part of the driver's seat, control of energization of the actuator 60 is carried out, and the detent shaft 22 (and consequently the detent lever 26) is thereby rotated selectively between the first rotational position and the second rotational position; for example, at the first rotational position the parking mechanism 20 attains a parking operated state (that is, a rotation-restricted state for the input gear G1), and at the second rotational position the parking mechanism 20 attains a non-operated state (that is, a rotation-allowed state for the input gear G1).

Disposed within the power-transmission case 10 of the transmission device A of the present embodiment are the parking mechanism 20 and the breather chamber BC, which is present above the input gear G1 and the intermediate gear G2 and provides communication between the interior and the exterior of the power-transmission case 10. The breather chamber BC in particular extends further outward than the input gear G1 in the direction in which the input gear G1 and the output gear G3 are arranged, and part of the parking mechanism 20 (more specifically, the upper part of the detent shaft 22) is disposed within the breather chamber BC. Because of this, even if the breather chamber BC is extended in the gear arrangement direction, since the part of the parking mechanism 20 is contained in the breather chamber BC thus extended, it is possible to increase the capacity of the breather chamber BC while avoiding any increase in the size of the transmission device A. Even if lubricating oil enters the breather chamber BC, since the breather chamber BC thereby has sufficient capacity for lubricating oil, it is possible to prevent lubricating oil from spilling over from the power-transmission case 10 or it is possible to extend an air flow path within the breather chamber BC, thus enhancing the performance in collecting oil mist.

The parking mechanism 20 of the present embodiment includes the parking gear 21, which is fixedly provided on the input shaft S1, the detent shaft 22, which can rotate around the vertical rotational axis X3, and the parking pawl 23, which can engage with and disengage from the parking gear 21 in association with rotation of the detent shaft 22. The detent shaft 22 extends in the up-and-down direction and extends through the breather chamber BC in the up-and-down direction. This makes it unnecessary to dispose the detent shaft 22 outward so as to avoid the breather chamber BC even if it is formed lengthwise in the up-and-down direction. As a result, it becomes possible to avoid any increase in the size of the transmission device A even with use of the detent shaft 22, which is long in the up-and-down direction.

The bottom wall part 9, which extends further outward than the input gear G1 in the gear arrangement direction, of the breather chamber BC has the through hole 9h in the up-and-down direction, which functions also as an inlet of the breather chamber BC, and the detent shaft 22 extends through the through hole 9h loosely (that is, via the cavity 70), thus narrowing the through hole 9h. This enables scattered lubricating oil (for example, lubricating oil scattered by the intermediate gear G2 or the input gear G1) to be prevented effectively from entering the interior of the breather chamber BC via the through hole 9h while ensuring smooth air flow in the through hole 9h. Moreover, such a detent shaft 22 is also used as means for narrowing the through hole 9h, thereby simplifying the structure of the transmission device A and consequently reducing the cost.

The bottom wall part 9 of the present embodiment has the thick portion 9a, which is thick in the up-and-down direction, and the through hole 9h extends through the thick portion 9a. This makes the through hole 9h (that is, the inlet of the breather chamber BC) extend lengthwise in the up-and-down direction, thus giving a structure in which it is more difficult for scattered lubricating oil to enter the interior of the breather chamber BC via the through hole 9h.

Furthermore, at least part of the detent shaft 22 that is on the side lower than the through hole 9h (for example, an intermediate part close to the lower end and a lower end part) is supported on the first and second bulging wall portions 11w1, 11w2, which are projectingly provided on the inner wall of the power-transmission case 10 so as to face inward. Since an upper part of the first bulging wall portion 11w1 positioned immediately beneath the through hole 9h closely opposes a lower end opening 9hi of the through hole 9h, due to the shielding effect of the first bulging wall portion 11w1, it becomes possible to suppress more effectively the entry of scattered lubricating oil into the through hole 9h (that is, the inlet of the breather chamber BC).

In synergy with the effect of narrowing the through hole 9h by means of the detent shaft 22, this enables scattered lubricating oil to be prevented more effectively from entering the interior of the breather chamber BC via the through hole 9h. Since the first bulging wall portion 11w1 is used as shaft support means for rotatably and stably supporting the detent shaft 22 as well as shielding means for shielding a passage for lubricating oil to the through hole 9h, it becomes unnecessary to provide shielding means exclusively used therefor, thus simplifying the structure and reducing the cost.

Moreover, since the lower end of the bottom wall part 9 of the breather chamber BC (in particular, the thick portion 9a) is present at a position lower than the upper end of the input gear, the lower end opening 9hi of the through hole 9h, which becomes the inlet of the breather chamber BC, can be set at a relatively low position so as to be close to the first bulging wall portion 11w1, and the effect of being close enables the entry of scattered lubricating oil into the through hole 9h to be suppressed more effectively. This enables scattered lubricating oil to be prevented from entering the interior of the breather chamber BC via the through hole 9h more effectively, and moreover, the bottom wall part 9 of the breather chamber BC can be disposed at a relatively low position, thus making it advantageous in terms of increasing the capacity of the breather chamber BC.

An embodiment of the present invention is explained above, but the present invention is not limited to the embodiment and may be modified in a variety of ways as long as the modifications do not depart from the subject matter.

For example, the embodiment illustrates a case in which the transmission device A is implemented as a transmission device for a vehicle (for example, an automobile) and the output torque of the output gear G3 of the transmission device A is distributed between the first and second output shafts 51, 52 (and consequently the left and right driven wheels) by means of the differential device D, but when the transmission device A is implemented in for example a two-wheeled motor vehicle, the differential device D may be omitted, and the output torque of the output gear G3 may be transmitted directly to the output shaft side. Alternatively, the transmission device A of the present invention may be implemented as a transmission device for various machines and devices other than a vehicle.

Furthermore, the embodiment illustrates a case in which rotational operation of the detent shaft 22 of the parking mechanism 20 (and consequently the detent lever 26) is carried out electrically by use of the actuator 60 fixed to the power-transmission case 10, but in the present invention an upper end part of the detent shaft 22 may be mechanically operatively linked to a parking operation input part of a driver's seat via a coupling mechanism, which is not illustrated, and the detent shaft 22 may be manually rotated by a driver's manual operation of the parking operation input part.

The invention claimed is:

1. A transmission device comprising, within a power-transmission case, a gear train having an input gear that is supported on an input shaft, an intermediate gear that is supported on an intermediate shaft parallel to the input shaft and that meshes with the input gear, and an output gear that can rotate around an output shaft parallel to the input shaft and that meshes with the intermediate gear, and a parking mechanism that can restrict rotation of the input shaft, wherein a breather chamber is provided within the power-transmission case, the breather chamber being present at least above the input gear and providing communication between an interior of the power-transmission case and an exterior of the power-transmission case, the breather chamber extends further outward than the input gear in an arrangement direction of the input gear and the output gear, and part of the parking mechanism is disposed within the breather chamber, the parking mechanism comprises a parking gear that is fixedly provided on the input shaft, a detent shaft that can rotate around a vertical rotational axis, and a parking pawl that can engage with and disengage from the parking gear in association with rotation of the detent shaft, the detent shaft extends in an up-and-down direction and extends through the breather chamber in the up-and-down direction, and a bottom wall part, extending further outward than the input gear in said arrangement direction, of the breather chamber has a through hole in the up-and-down direction that also functions as an inlet of the breather chamber, and the detent shaft extends through the through hole via a cavity.

2. The transmission device according to claim 1, wherein at least part of a portion, that is further downward than the through hole, of the detent shaft is rotatably supported on a bulging wall portion that is projectingly provided on an inner wall of the power-transmission case so as to face inward, and an upper part of the bulging wall portion opposes a lower end opening of the through hole across a gap.

3. The transmission device according to claim 2, wherein a lower end of the bottom wall part of the breather chamber is disposed at a position lower than an upper end of the input gear.

4. The transmission device according to claim 1, wherein a lower end of the bottom wall part of the breather chamber is disposed at a position lower than an upper end of the input gear.

* * * * *